May 8, 1962     E. SCHLUETER     3,033,601
HOOK LEVER LOCK
Filed May 26, 1959     2 Sheets-Sheet 1
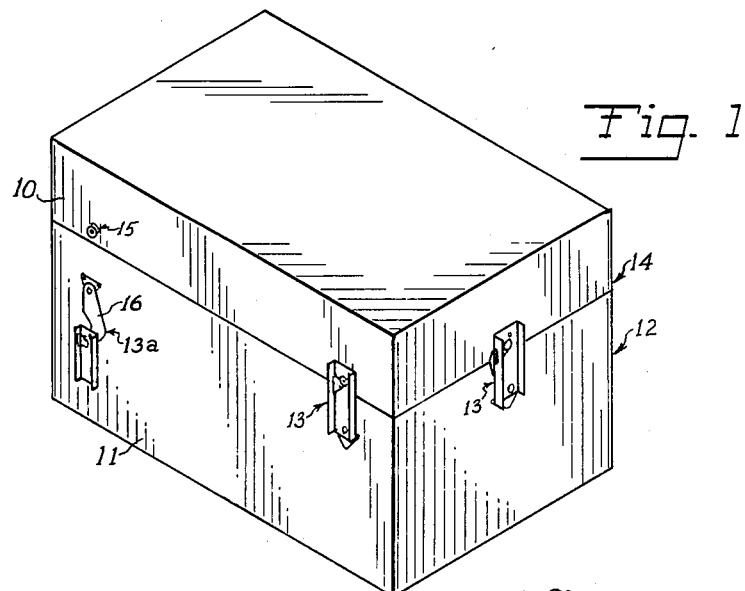
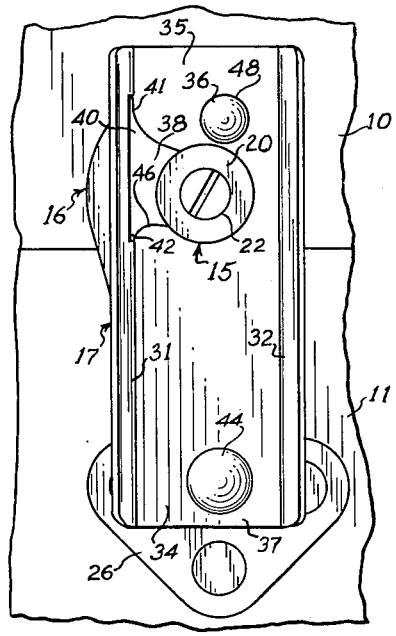
Fig. 2
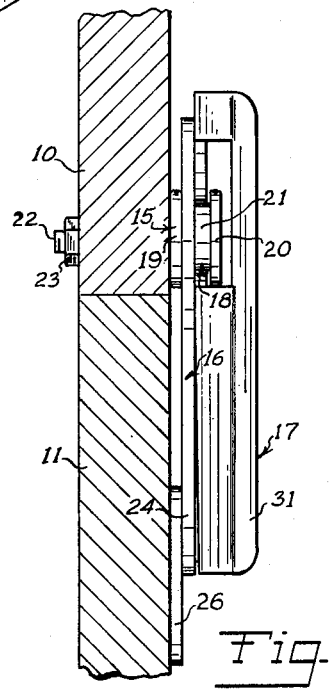
Fig. 3
INVENTOR.
ERNEST SCHLUETER
BY
*F. K. Jenkins*
AGENT

INVENTOR.
ERNEST SCHLUETER 3,033,601
HOOK LEVER LOCK
Ernest Schlueter, 74 Edwards Road, Troy, N.Y.
Filed May 26, 1959, Ser. No. 815,952
5 Claims. (Cl. 292—100)

This invention relates to fastening devices and more particularly to hooking devices for the fastening together of panel members edge-to-edge although the fastener may be used to attach almost any two members in substantially fixed relationship to each other when one affords a mounting for a pivoted hook and the other a keep member therefor.

One object is to provide a hook fastener wherein the hook and keep member may be brought into engagement and held against substantial movement in all directions relative to each other, both in substantially one simple operation.

Another object is to provide such a device wherein great leverage may be applied to the hook in hooking and unhooking operations.

Still another object is to provide an operating piece for a hook which will protect the hook and keep member therefor, in locked position, from accidental blows.

The above and other apparent objects are realized by the means of the invention which briefly described includes, for use on fastened members, a hook pivotally mounted on one member and a keep on the other, and an operating lever or piece for pivotal mounting on the hook and adapted to bear against the keep for moving the hook.

Figure 4:
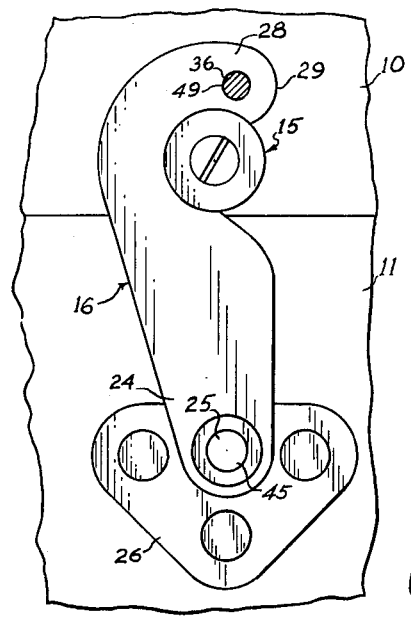
Figure 5:
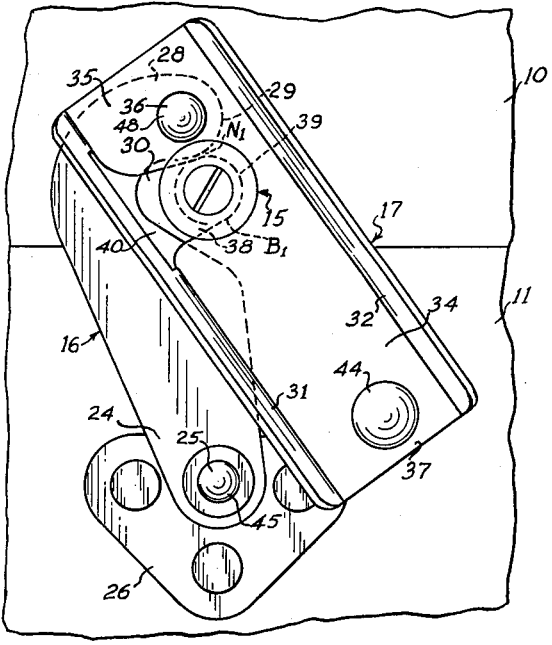
Figure 6:
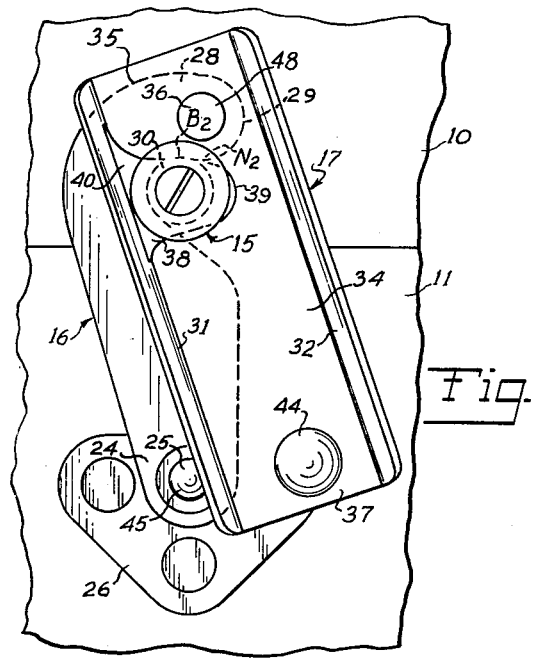
Figure 7:
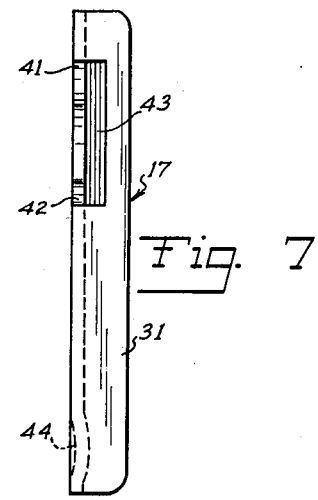

In the accompanying drawing showing, by way of example, one of many possible embodiments of the invention, FIG. 1 shows a container carrying the fastener;
FIG. 2 is a front view of the fastener in locked position;
FIG. 3 is a side view of the fastener in locked position;
FIG. 4 is a front view of the fastener in locked position with the operating piece removed to show the hook and keep;
FIGS. 5 and 6 are operational views of the fastener, and
FIG. 7 is a side detail of the operating piece.

The invention is used as illustrated to secure two adjacent co-planar panels or panel members 10 and 11 such as side panels of a container 12 and cover 14 therefor, though it is readily appreciated that the use of the panel members need not be confined to any particular type of structure. Resilient gasket-like packing (not shown) may be interposed between the panels.

The fastener, generally designated 13, comprises a stud as a keeper member, generally designated 15, secured to one panel, a hook 16 pivotally mounted on the other panel, and an operating piece 17 pivotally mounted on the hook, all being described in detail below. FIG. 1 shows two fasteners 13 in locked position while one fastener, 13, is shown unlocked and with the hook and operating piece in "dangling" position.

The keeper member 15 as shown includes a metal spool-like roller 18, having inner and outer flanges 19 and 20 and an intermediate portion 21 of cylindrical shape. The roller is mounted on the panel 10 by a screw 22 and nut 23 with the inner flange 19 against the panel. It is preferable of course that the roller turn on its mounting, particularly when the fastener moves to locking position as in FIG. 5. If the panel 10 is of metal no binding of the roller usually occurs. If necessary, a washer (not shown) may be interposed between the panel and roller.

The hook 16 is of generally, as shown, reverse 7-shape and is preferably of slightly resilient material such as heavy sheet steel. A thickness of about $\frac{1}{16}$" is satisfactory in many instances, but the thickness used is essentially to keep the hook substantially from bending. The hook has a tail portion 24 pivotally mounted on the panel 11 by means of a rivet 25 on a triangular mounting plate 26 fast on the panel 11, the hook being substantially mono-planar and pivoted to swing in a plane parallel with the plane of the panels.

The other end portion of the hook includes a nose portion 28 rounded as at 29 at the end and a round keeper engaging recess 30 contiguous with the nose portion. In locking position as shown in FIG. 4, with the operating piece removed, the nose portion projects laterally beyond a line joining the centers of the pivot rivet and the keeper and slightly toward the pivot as at N in FIG. 5 so that, as shown the keeper is rather snugly embraced at the top and extensively to the left within the recess. Over-hang and over-ride by the nose portion hold the hook in place very much as with an ordinary hook.

It is contemplated that in many uses the amount of over-hang and the closeness of fit of the panels will be so great that the hook cannot be, at least easily, operated directly by hand.

The hook is operated by the previously mentioned operating piece 17 which is of slightly resilient metal and channel shaped, having flanges 31 and 32 and a web 34. One end portion 35 of the web portion is pivotally mounted to the hook's nose portion 28 by a pivot member 36, the flanges of the channel projecting outwardly from the hook so that the operating piece may swing about the nose in a plane substantially parallel with that of the panels.

The operating piece 17 acts as a lever bearing against the roller as a fulcrum. For this purpose the web and part of the flange 31, opposite from the direction of projection by the nose in locked position, is cut away to provide a generally arcuate laterally open slot 38 in the web, the center of curvature of the slot being at the pivot 36.

As can be understood from the drawing, when the hook and operating piece are opened out to substantially axially alined positions, as at 13a in FIG. 1, the fastener has inner and outer keeper receiving notches or recesses. The outer recess is the slot 38 and the inner is the recess 30, both opening laterally in the same direction. In operation, the operating piece and hook are swung about for the keeper member 15 to enter into the slot 38. Since the slot is somewhat arcuate, this initial engagement is of itself somewhat a hooking action of the keeper into the slot if the operating piece must be opened out for the keeper to enter the slot. Final, and more forceful hooking by the hook takes place as shown in FIG. 5 and described below.

The slot 38 laterally receives the roller 18 and preferably is rounded at its closed end as at 39 to limit clockwise turning of the piece 17 about the pivot 36 to locked position as in FIG. 2 and for other purposes mentioned below. The slot is flared at its open end as at 40 (FIG. 6) to enable easy entry of the roller. In locked position, the web 34 and hook 16 both lie between the roller flanges 19 and 20; and to permit entrance of the outer flange 20, notches 41 and 42 are provided in the channel flange 31, as is the window 43.

The invention can best be described now by its mode of operation and with reference to FIG. 5. The panels 10 and 11 are close enough to each other for the fastener to be effectively used. The hook 16 and operating piece 17 are swung so that the roller 18 enters the slot 38 and the piece 17 is turned clockwise. The initial action in this movement is a pivotal movement more about pivot pin 36 (than about the roller) with a forcing down on the roller to draw the panels nearly to maximum proximity. The system then assumes a condition approximately as shown in FIG. 5. Further turning is more in the nature of movement about the roller as a fulcrum with a bearing zone about at $B_1$ and a pulling of the nose over the roller at $N_1$.

Dead center occurs with the operating piece about half way between positions shown in FIGS. 5 and 6 and the hook slips into position as in FIG. 4 with the operating piece being advanced clockwise to FIG. 6 position relative to the hook.

To clearly indicate that the hook is in locked position, and more important to insure that the roller and hook remain in fixed position relative to each other irrespective of the force between the panels, the operating piece is further turned in a clockwise direction to a position as in FIG. 2 where detent recess 44 in the end portion 37 of the web receives a head 45 on the rivet 25, to insure that the channel piece maintains itself laterally against the roller. The relative distances from the roller to the pivot 36 and detent are such that a very great lateral force by the roller on the channel member will be necessary to cause turning of the latter about the pivot 36.

It is to be noted that recesses 30 in the hook and 38 in the web have round inner ends and that the two parts, when the fastener is in position in FIG. 2, together embrace the roller so that the latter snugly fits in a substantially circular hole in the combination of web and hook. Since the roller can rotate, any wear on it by the nose can be distributed over its circumference.

During unlocking, the operating piece is turned counter-clockwise from the position of FIG. 2 to substantially that shown in FIG. 6, generally without movement of the hook relative to the roller. The web then begins to bear on the roller as at about $B_2$ with a relative withdrawing of the nose at about $N_2$ over the roller until the hook no longer restrains the roller.

It is preferable that the rivet head 45 be high enough relative to the thickness of the web and hook with respect to the distances between the roller flanges 18 and 19, so that the base of the tongue 46 (FIG. 2) formed by the slot 42 (FIG. 7) will resiliently bear against the roller flange 20. With this construction, when the operating piece is detained in FIG. 2 position, the keeper and fastener are firmly held against relative movement in all directions no matter whether forces tend to separate the panels or not.

While the use of the operating piece is highly desirable, and when there is no appreciable force tending to urge the panels apart, the operating piece is virtually necessary to hold the roller and hook engaged, there may be instances when the operating piece may be omitted. Such instances obtain when there is constant urging apart of the panels, as when the container 12 is well filled with resilient contents heavy packing provided between the panel edges, or when the closeness of fit is such that inherent resilience of panels, as when of wood, enables the fastener to function more as a normally restrained hook.

In such a case the head 48 of the pivot member 36 may be omitted and such member may then be in the nature of a projecting stud. In such a case a lever or tool in the nature, say, of a long eye bolt (not shown) may be fitted over the keeper, or pivot member 36 and made to bear against the other to effect the hooking by the hook. The lever or tool can then be removed for action on another hook. In such use of the invention it is contemplated that the member 36 and keeper project sufficiently for engagement by the tool.

Alternately, the pivot member 36 may be omitted from the hole 49 in the nose and a stud provided for the tool.

The operating piece, however, affords additional advantages not hitherto mentioned.

For example, by having the web 34 wide enough to cover the nose 28 the latter is protected against blows which might damage the hook. The flanges 31 and 32, projecting outwardly, give protection to the roller and additionally serve as hand or finger pieces.

The invention claimed is:

1. A fastening device for holding panels together edge-to-edge said fastener comprising a stud-keep member on one panel; a hook member of heavy sheet slightly resilient material pivotally mounted at a point near one end of the hook member and on the other panel to swing a plane substantially parallel with the panels, the other end portion being provided with a recess and nose portion to engage over the keep member; an operating lever having a flat portion parallel with the hook member and adjacent thereto; a pivot member on the forward part of the nose portion for mounting the lever near one end thereof at a point on said forward part so that when the keep member is normally engaged in locking position in the recess, a straight line joining the two mentioned points lies forward of the axis of the keep member, said lever being provided with a generally arcuate slot laterally open and flared to receive the keep member whereby lever action by a turning of the lever will force the keep member toward the adjoining panel and also drag the nose portion of the hook member over the keep member until the latter enters the recess, the recess and slot provided in the hook member and lever being curved at marginal portions to provide a substantially circular aperture for the stud-keep member when the fastener is in closed locking position, and to provide a marginal portion of the slot toward the pivot member to engage to bear on the stud-keep member for lifting the nose portion slightly therefrom when the lever is turned about the pivot member from locking to unlocking position.

2. A fastening device as claimed in claim 1, said operating lever being channel shaped and having a web as said flat portion, and having a flange provided with an opening in communication with the arcuate slot.

3. A fastening device as claimed in claim 1 said keep member including a roller and means for mounting same on said one panel, the inner portion of the arcuate slot being about as wide as the diameter of the roller for enabling the lever to engage substantially radially against the roller, both for locking and unlocking action, to slightly deform the hook member for getting the nose over the roller as the operating lever is turned about the pivot member and roller.

4. A fastener for a keeper comprising a hook having a recess and mounted for pivotal movement at one end and having a nose portion contiguous with the recess at the other end and adapted to engage over the keeper; an operating lever having a handle at one end for drawing the nose portion over the keeper; a pivot member on the other end of the lever pivotally connecting same to the nose portion, the lever having a fulcrum portion intermediate the handle and pivot member and provided with a laterally open slot having a closed end to receive the keeper for the fulcrum portion to bear against, the slot being slightly slanted with the closed end toward said handle to tend to retain the keeper in the slot as the lever is turned against the keeper to draw the nose portion over the keeper and for the marginal portion of the slot toward the pivot member to engage the keeper and the lever and lift the nose portion from the keeper when the lever is turned in the opposite direction when the keeper is in said recess and slot.

5. A fastener for a keeper comprising an elongated hook having a recess and a shank and mounted for pivotal movement at one end, and having a nose portion contiguous with the recess at the other end and adapted to engage over the keeper, a longitudinal operating lever having a handle at one end for drawing the nose portion over the keeper, a pivot member on the other end of the lever pivotally connecting same to the nose portion, the lever having a fulcrum portion intermediate the handle and pivot member and provided with a laterally open slot having a closed end to receive the keeper for the fulcrum portion to bear against, the slot being slightly slanted with the closed end toward said handle to tend to retain the keeper in the slot as the lever is turned against the keeper to draw the nose portion over the keeper and for the marginal portion of the slot toward the pivot member to engage the keeper and the lever and lift the nose portion from the keeper when the lever is turned in the opposite direction when the keeper is in said recess and slot, said lever and hook when substantially alined and superimposed relative to each other providing a substantially circular opening formed by the closed end of the slot and marginal portions of the recess to embrace all around the keeper.

References Cited in the file of this patent

UNITED STATES PATENTS

| | | |
|---|---|---|
| 909,037 | Taylor et al. | Jan. 5, 1909 |
| 1,517,995 | Langenau et al. | Dec. 2, 1924 |
| 1,772,326 | Smith | Aug. 5, 1930 |
| 2,367,127 | Johansson | Jan. 9, 1945 |
| 2,676,825 | Ross | Apr. 27, 1954 |
| 2,895,201 | Henry | July 21, 1959 |

FOREIGN PATENTS

| | | |
|---|---|---|
| 380,015 | Germany | Aug. 31, 1923 |